United States Patent [19]

Daudet et al.

[11] Patent Number: 4,597,362

[45] Date of Patent: Jul. 1, 1986

[54] FLUIDIZED BED COMBUSTOR

[75] Inventors: Howard C. Daudet, Phoenix; Weldon D. Bagley, Tempe, both of Ariz.

[73] Assignee: The Garrett Corporation, Los Angeles, Calif.

[21] Appl. No.: 647,598

[22] Filed: Sep. 5, 1984

[51] Int. Cl.⁴ .............................................. F22B 1/00
[52] U.S. Cl. .................................. 122/4 D; 110/245; 110/263; 165/104.16
[58] Field of Search ............... 122/4 D; 110/245, 263, 110/347; 431/7, 170; 165/104.16; 34/57 A

[56] References Cited

U.S. PATENT DOCUMENTS

| | | |
|---|---|---|
| 2,932,498 | 4/1960 | Metcalfe et al. |
| 3,267,586 | 8/1966 | Molstedt et al. |
| 3,371,425 | 3/1968 | Glaser et al. |
| 3,814,176 | 4/1974 | Seth |
| 4,021,184 | 5/1977 | Priestley |
| 4,023,280 | 5/1977 | Schora et al. |
| 4,377,119 | 3/1983 | Noack ............................. 110/245 X |
| 4,475,472 | 10/1984 | Adrian et al. ................... 122/4 D X |

Primary Examiner—Edward G. Favors
Attorney, Agent, or Firm—James W. McFarland; Albert J. Muller

[57] ABSTRACT

A fluidized bed combustor having a velocity control zone for developing optimum aerothermodynamic conditions for improved combustion, fluidized bed operation, and heat transfer capabilities.

10 Claims, 1 Drawing Figure

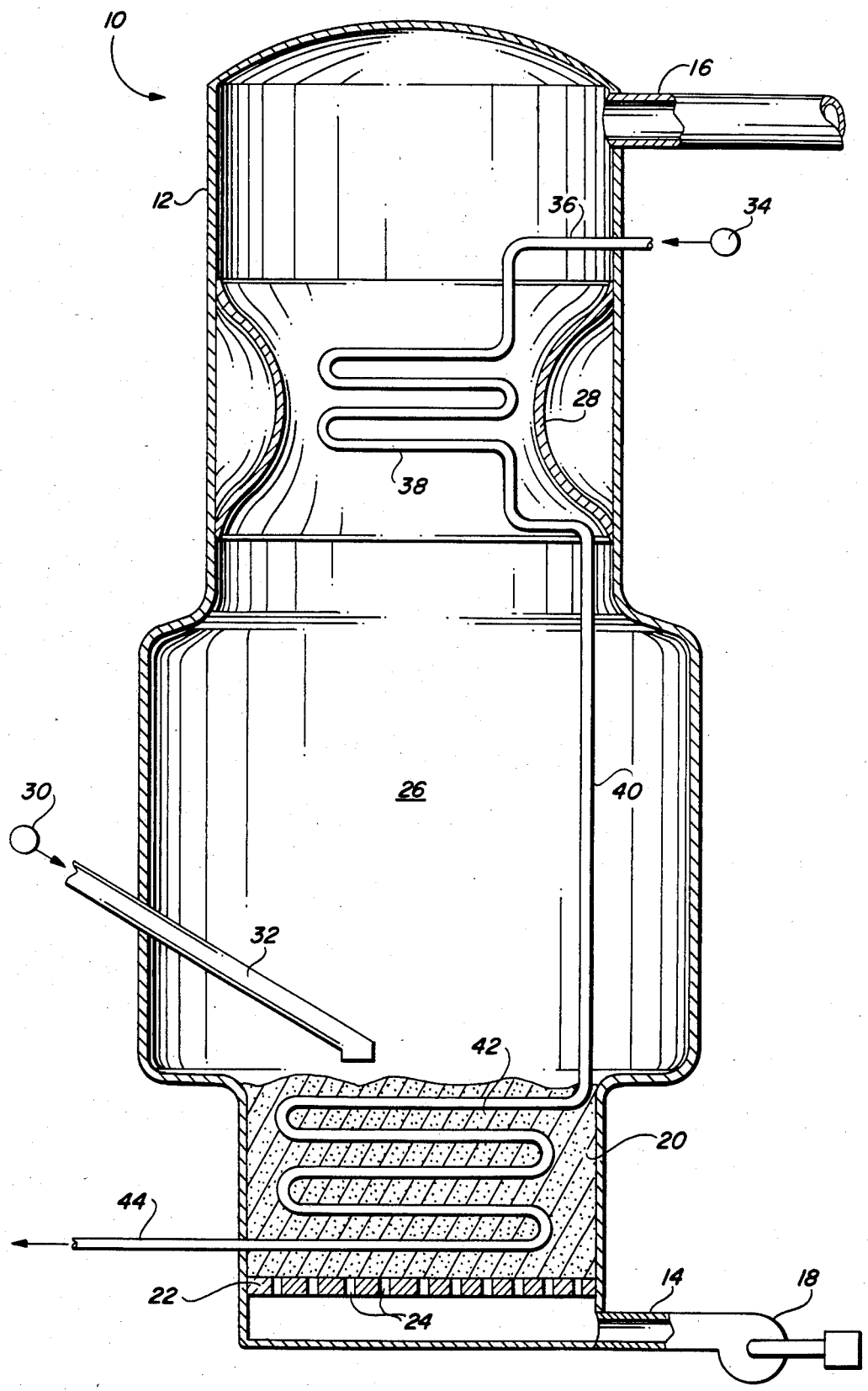

example, while the heat transfer coefficient for solid-to-solid heat transfer is generally improved with increased residence time of contact between the solids, heat transfer by convection is enhanced by increased gas velocity.

FLUIDIZED BED COMBUSTOR

BACKGROUND OF THE INVENTION

This invention relates to fluidized bed combustors and more particularly to improve the aerothermodynamic characteristics in such combustors for use in burning solid or highly viscous fuels.

Fluidized bed combustors are characterized by use of a generally static bed of granular inert material which is maintained in a fluidized state by passage of airflow therethrough. Such fluidized beds have been found highly useful in burning of solids or very heavy fuel oils. More particularly, the solid fuel in a granular state is introduced into the fluidized bed where combustion occurs. Typically the operating range of such a fluidized bed when used as a combustor is relatively wide with respect to the superficial velocity of airflow therethrough. More specifically, such a fluidized bed is theoretically operational between the minimum superficial velocity which establishes incipient fluidization of the bed, up to a maximum superficial velocity wherein elutriation of the bed particles themselves would occur.

Upon consideration of other aerothermodynamic characteristics of such a combustor, practical limitations required to establish efficient combustion as well as overall fluidized bed operation dramatically affect the operating range of the fluidized bed in terms of permitted superficial velocities. For example, the combustion efficiency when burning solid fuels is not only the function of the available oxygen, but also the temperature of the oxidizing zone and residence time in the oxidizing zone. Combustion efficiency is normally determined in terms of the total hydrocarbons converted to heat energy as a percentage of the total amount of convertible hydrocarbons provided by the fuel. Complete combustion or conversion of the hydrocarbons to heat energy can be achieved in a shorter time but at the expense of higher peak temperature within this zone. Alternately, lower peak temperatures may be utilized if the residence time in the combustion or conversion zone is increased.

Continuous operation of such a fluidized bed also requires proper and adequate removal of burned particles and flyash. Without such scavenging the bed itself tends to grow in size and become contaminated, reducing combustion efficiency. However, the superficial velocities required within and above the fluidized bed zone to establish good scavenging of the burned ash particles outwardly from the combustor are substantially different than those velocities required for ideal residence time within the combustor zone. Accordingly substantially narrow operational limits of the superficial velocities of the gas stream are imposed upon such a fluidized bed combustor. Such narrow operational limits, in addition to inhibiting design variations for minimizing peak temperatures, also tend to impose complicated and expensive controls for proper, continuous bed operation.

In addition to efficient combustion efficiency as well as proper overall operation of the entire combustor, the combustor must also be designed to maximize transfer of heat to a useable form. More particularly, many such fluidized bed combustors are used to heat a cycle fluid such as steam which is then transported to remote locations to perform useful work. The factors of efficient heat transfer are not necessarily compatible with those factors promoting efficient heat generation itself. For example, while the heat transfer coefficient for solid-to-solid heat transfer is generally improved with increased residence time of contact between the solids, heat transfer by convection is enhanced by increased gas velocity.

SUMMARY OF THE INVENTION

It is an important object of the present invention to provide improved aerothermodynamic characteristics of a fluidized bed combustor particularly for use in burning solid or highly viscous fuels.

More particularly, it is a purpose of the invention to provide such improved fluidized bed combustor operational characteristics in a highly simplified fashion without incorporation of expensive, complicated controls.

A further object of the present invention is to provide such a fluidized bed combustor and method wherein peak temperature may be reduced while establishing more complete combustion, yet at the same time providing broader operational limits of the combustor in terms of permitted superficial velocities.

Another object is to provide a fluidized bed combustor and method as set forth in the preceding object wherein adequate scavenging of consumed particles and flyash are maintained without affecting the combustion efficiency.

Yet a further object is to provide such an improved fluidized bed combustor and method with improved heat exchange characteristics for a cycle fluid used therewith.

In one form of the invention such improved aerothermodynamic characteristics are provided by incorporation of a velocity control zone at a particular location within the fluidized bed combustor. More specifically, a venturi throat is provided in the fluidized bed combustor above the freeboard section and below the exhaust outlet to produce an increased velocity laminar flow of effluents from the freeboard section of the combustor in order to carry fully consumed particles and flyash outwardly of the combustor to the outlet thereof. Incorporation of such a venturi thereby permits the superficial velocity of flow through the fluidized bed and freeboard section to be substantially reduced, i.e., to a velocity which by itself, would not provide adequate scavenging of the burned particles. At the same time this also provides increased residence time and improves the combustion efficiency while minimizing the peak temperatures developed during combustion. Accordingly, the invention provides various velocity sections within the fluidized bed so as to permit utilization of the velocities required in the bed zone for ideal residence time, while creating higher velocities above the freeboard section to produce good scavenging.

It has also been found that the present invention provides method and apparatus for improving the heat transfer characteristics to the cycle fluid which utilizes the heat generated during combustion. More particularly, a heat exchanger operating on convection and radiation heat transfer characteristics may be included in the venturi section which has the higher velocities, thus improving the heat transfer coefficient by convection. Additionally, a second heat exchanger immersed within the fluidized bed itself promotes good solid-to-solid heat transfer. The high residence time afforded by the low superficial velocities in the fluidized bed further improves the heat transfer in the fluidized bed portion. Further, the improved heat transfer to the cycle fluid within the heat exchanger immersed in the fluidized bed has been found to reduce the peak temperature developed therewithin during combustion. Such reduced peak temperature also reduces material costs in construction.

These and further objects and advantages of the present invention are specifically set forth in or will become apparent from the following detailed description of the preferred form of the invention when read in conjunction with the accompany drawing.

BRIEF DESCRIPTION OF THE DRAWING

The single FIGURE is a schematic, partially cross-sectional elevational view of a fluidized bed combustor constructed in accordance with the principles of the present invention.

DETAILED DESCRIPTION OF THE PREFERRED EMBODIMENT

Referring now more particularly to the drawing, a fluidized bed combustor 10 includes a vertically upstanding, generally cylindrical housing 12 having an air inlet 14 near the bottom thereof and an exhaust outlet 16 near the top thereof. It will be understood by those skilled in the art that the fluidized bed combustor 10 as illustrated in the figure may be used with other system components such as emission control devices, preheaters, cyclone separators, and other associated devices not shown. Inlet 14 receives airflow from a centrifugal compressor or other pressurized air source 18 for delivery into the housing 12 in order to fluidize a bed 20 of non-combustible inert granular material. The bed of granular material is carried upon a support illustrated in the form of a plate 22 having a plurality of perforations 24 for uniformly distributing the pressurized air into the bed. Vertical tuyeres may be included in the perforations. The bed material is normally finely divided and may also have a sorbent material therewithin. Screens (not shown) may be used in conjunction with support plate 22 to maintain the bed 20 in the lower portion of housing 12 as illustrated. Other support designs may include vertical tuyeres or various duct designs such as a plurality of sparger pipes.

Extending a substantial vertical distance above bed 20 is a freeboard portion or section 26 of housing 12 characterized by its relatively large horizontal cross-sectional area or large diameter to promote high residence time of the effluent passing through. The freeboard section 26 illustrated is of relatively constant diameter; however, in some applications a variable diameter portion may be utilized. The important aspect of the freeboard section is that it is of substantial vertical height and has a substantial horizontal cross-section in order to establish the superficial velocity of effluent passing therethrough.

Disposed above freeboard section 26 in a fixed location on housing 12 is a single venturi 28 acting as a velocity control section. Preferably, venturi 28 is sized such that its throat area develops velocities of airflow upwardly therethrough in a range of 1.7 to 2.5 times the lower superficial velocity in freeboard section 26.

Fuel, either granular solid fuel or certain heavy fuel oils of high viscosity are fed from a source 30 to a fuel duct 32 into the bed 20 of inert material. Combustion occurs primarily within bed 20 and ideally extends only a very short distance, if at all, into freeboard section 26.

Cycle fluid such as steam or a gas is carried from a source 34 through conduit 36 into a preheating heat exchanger 38 disposed within the venturi 28 and thus exposed to the higher velocity laminar flow of effluent thereat. From heat exchanger 38 the cycle fluid serially passes through conduit 40 to a primary heat exchanger 42 immersed within the fluidized bed 20. The heated cycle fluid is discharged through conduit 44 to a remote location to perform useful work.

In operation, combustion air is introduced through inlet 14 to pass vertically upwardly through housing 12. This airflow establishes the vertical superficial velocity of air and gases through bed 20 and freeboard section 26. The superficial velocity may be chosen anywhere within the theoretical operational range of the fluidized bed, i.e., between a minimum velocity wherein incipient fluidization occurs, to a maximum velocity wherein the particles within bed 20 would be elutriated or carried upwardly into the freeboard section. Elutriation of the bed particles is a function of the particle size of the inert bed material and the vertical gas velocity through the bed.

By incorporation of venturi 28, the present invention permits the superficial velocity to be established at a relatively low value, i.e., a sufficiently low vertical velocity which would not carry consumed particles upwardly to outlet 16. Highly viscous or solid carbonaceous fuel is fed into bed 20 where combustion occurs. Because of the low superficial vertical velocity, a relatively high residence time of the materials to be burned is established within the zone of combustion in bed 20. As a result, complete conversion of the hydrocarbons in the fuel can be achieved at temperatures substantially below normal stoichiometric levels due to the high residence time and low oxidation rate.

The effluent is carried vertically into freeboard section 26 in a highly turbulent or boiling flow therewithin. Heavier unconsumed particles may thus return downardly for further combustion while only lighter flyash and fully consumed particles reach into the upper levels of freeboard section 26. Venturi 28 also tends to establish a zone immediately therebelow ( at the top level of freeboard section 26) which is characterized by a slightly lower velocity and higher pressure flow. This tends to act as somewhat of a barrier against heavier particles to prevent them from reaching the venturi before being fully consumed.

The venturi establishes a relatively high velocity laminar flow therethrough whose actual velocity is determined by the cross-sectional area at the throat of venturi 28. Venturi 28 is sized in relation to the established superficial velocity so as to provide sufficient acceleration to scavenge the fully consumed particles upwardly out of freeboard section 26 so that they may be carried through outlet 16.

Use of the present invention reduces the amount of discharged material which must be recycled for re-burning in the combustor. Burning is maximized the first time through the combustor.

In one example, utilization of a solid fuel having a feed stock size of 3/16"—mesh is introduced into bed 20 to develop ejection of flyash and consumed particle size of up to 110 microns. The venturi is sized relative to the superficial velocity so as to develop approximately ten feet per second velocity flow through the venturi 28; yet the superficial velocity is established significantly below ten feet per second, even two feet per second or less, to match the desired residence time in bed 20 for most efficient combustion of the particular fuel being used. Preferably, the venturi velocity is between 1.7 and 3.5 times the vertical superficial velocity through the freeboard section. More specifically, a venturi velocity of approximately twice the superficial velocity is preferred to maintain excellent combustion characteristics while providing proper elutriation of the consumed particles and flyash in many applications.

The steam cycle fluid from source 34 is preheated in heat exchanger 38 by virtue of convection and radiation heat exchange with the exhaust effluent in the laminar flow developed by the venturi. This relatively high velocity increases the heat exchange coefficient and promotes good preheating of the cycle fluid in heat exchanger 38. Serially, the cycle fluid then passes to the primary heat exchanger 42 for primary heating therein. Heat exchange is essentially conducted by solid-to-solid contact in the bed of granular material by virtue of contact between the inert material and the walls of heat exchanger 42. To further promote this heat transfer, the relatively high residence time afforded by the low superficial velocities of the present invention significantly increases heating of cycle fluid in heat exchanger 42. This improved heat exchange in the fluidized bed minimizes the freeboard temperature. Tests have shown freeboard temperatures as much as 400° F. below bed temperatures by operating the fluidized bed with heat exchanger 42 and at very low superficial velocities as permitted by the present invention.

From the foregoing it will be apparent that the present invention also provides a improved method of operating a fluidized bed by optimizing the operational efficiency thereof. Such method includes generating a upward flow of combustion air through the bed 20 of granular inert material to suspend the bed in the desired fluidized state. Solid or highly viscous fuel is burned in the bed to generate heat. Above the fluidized bed a vertically extending zone is created characterized by a relatively low superficial velocity, turbulent flow of effluent which develops a relatively high residence time of combustion components within the bed to minimize the peak temperature developed therein while maintaining high combustion efficiency of the fuel. Above this vertically extending zone, a substantially higher velocity, laminar flow of effluent is developed to insure ejection of gases and fully consumed particles from the fluidized bed in a manner that does not disturb the relatively low superficial velocity, turbulent flow conditions within bed 20 and freeboard section 26. Additionally the method includes the passage of cycle fluid through a preheat heat exchanger located in the high velocity laminar flow and then directing preheated cycle fluid into the primary heat exchanger immersed the bed 20. Preferably the venturi velocity created is within the range of 1.7 to 3.5 times the superficial velocity.

Various modifications and alterations to the present invention will be apparent to those skilled in the art. Accordingly, the foregoing detailed description of a preferred embodiment of the invention should be considered exemplary in nature and not as limiting to the scope and spirit of the invention as set forth in the appended claims.

Having described invention with sufficient clarity that those skilled in the art may make and use it, we claim:

1. A fluidized bed combustor, comprising:
   a vertical housing;
   a bed of granular, generally non-combustible material disposed in a lower portion of said housing;
   means for delivering combustion air into said housing for upward flow through said bed to maintain said granular material in a fluidized state;
   means for delivering fuel to said bed for combustion therein to generate heat;
   heat exchanger means adapted to carry a cycle fluid and arranged in said housing for transferring heat of combustion to said cycle fluid, said heat exchanger means including first and second heat exchangers, said first heat exchanger immersed within said bed for promoting heat transfer primarily through solid-to-solid surface contact between said granular material and said first heat exchanger;
   said housing having a portion with a relatively large horizontal cross-section extending vertically above said bed for maintaining a relatively low superficial vertical velocity of combustion effluent therein to optimize said heat transfer by solid-to-solid contact; and
   a venturi disposed above said portion of the housing for substantially increasing the velocity of combustion effluent passing therethrough without disturbing said low superficial velocity of effluent in said portion of the housing, said second heat exchanger disposed within said venturi and operable to transfer heat to said cycle fluid primarily by convection and radiation from the effluent gas to said heat exchanger, said venturi operable to maintain said effluent at a relatively high velocity at said second heat exchanger for prompting the heat transfer by convection and radiation said first and second heat exchangers being serially connected.

2. A fluidized bed combustor for burning solid or highly viscous fuel, comprising:
   a vertically upstanding housing having an air inlet generally at the bottom of the housing and an exhaust outlet generally at the top of the housing;
   a perforated support plate laterally traversing said housing above said inlet;
   a bed of granular, inert material disposed in said housing supported by said plate;
   means for delivering combustion air to said inlet for generally upward flow through said bed to maintain said granular material in a fluidized state;
   means for delivering solid or high viscous fuel to said bed for combustion therein;
   a source of cycle fluid to be heated;
   a primary heat exchanger for carrying said cycle fluid and disposed within said bed to transfer heat to said cycle fluid primarily through solid-to-solid contact between said granular material and said primary heat exchanger;
   said housing including a vertically extending freeboard section disposed immediately above said bed having a relatively large horizontal cross-section for maintaining a low superficial velocity, turbulent flow of effluent from said bed to optimize the transfer of heat by said solid-to-solid contact and to increase retention time of relatively heavy particles in the effluent flow within said freeboard section;
   a venturi disposed in said housing above said freeboard section for accelerating the flow of effluent therethrough to a venturi velocity substantially greater than said superficial velocity to permit increased flow of fully consumed particles through said venturi to be carried to said outlet; and
   a pre-heating heat exchanger disposed within said venturi and carrying said cycle fluid for transferring heat from said effluent to the cycle fluid primarily by gas-to-solid convection and radiation, said venturi promoting gas-to-solid heat transfer without disturbing said low superficial velocity flow in said freeboard section, said source of cycle fluid being serially connected with said pre-heating heat exchanger and said primary heat exchanger.

3. A fluidized bed combustor for burning solid, granular fuel, comprising:

a vertically upstanding housing having an air inlet generally at the bottom of the housing and an exhaust outlet generally at the top of the housing;

a perforated support plate laterally traversing said housing above said inlet;

a bed of granular, inert material disposed in said housing supported by said plate;

means for delivering fuel to said bed for combustion therein;

means for delivering combustion air to said inlet for generally upward flow through said bed to maintain said granular inert material in a fluidized state;

a source of cycle fluid to be heated;

a primary heat exchanger for carrying said cycle fluid and disposed within said bed to transfer heat to said cycle fluid primarily through solid-to-solid contact between said granular inert material and said primary heat exchanger;

said housing including a vertically extending freeboard section disposed immediately above said bed having a constant, relatively large horizontal cross-section for maintaining a low superficial velocity, turbulent flow of effluent from said bed to optimize the retention time within said freeboard section and to promote transfer of heat by said solid-to-solid contact;

a single, fixed venturi disposed in said housing above said freeboard section and below said exhaust outlet for accelerating the flow of substantially all of said effluent carried to said exhaust outlet to a venturi velocity in the range of approximately 1.7 to 3.5 times said superficial velocity; and a pre-heating heat exchanger disposed within said venturi and carrying said cycle fluid for transferring heat from said effluent to the cycle fluid primarly by gas-to-solid convection and radiation, said source of cycle fluid being serially connected with said pre-heating heat exchanger and said primary heat exchanger.

4. A fluidized bed combustor as set forth in claim 3, wherein said venturi velocity is about twice said superficial velocity.

5. A fluidized bed combustor as set forth in claim 4, wherein said venturi velocity is sufficient to carry particles of up to approximately 110 micron diameter to said exhaust outlet.

6. A fluidized bed combustor as set forth in claim 5, wherein said fuel is a solid granular fuel whose size is approximately 3/16"—mesh.

7. A fluidized bed combustor as set forth in claim 6, wherein said venturi velocity is approximately ten feet per second.

8. A method of optimizing the operational efficiency of a fluidized bed combustor adapted to burn solid or highly viscous fuel by controlling the velocity of effluents therefrom, comprising the steps of:

generating an upward flow of combustion air through a bed of granular, inert material to suspend said bed in a fluidized state;

burning solid or high viscous fuel in said bed to generate heat;

creating a vertically extending zone above the bed of low superficial velocity, turbulent flow of effluent exhausting from the bed to establish a relatively high residence time of combustion components within said bed to minimize the peak temperature developed therein while maintaining optimum combustion efficiency of said fuel;

developing a substantially high velocity, laminar flow of effluent immediately above said turbulent zone for assuring ejection of gases and fully consumed particles from said combustor without disturbing said low superfical velocity, turbulent flow conditions within said zone;

directing a cycle fluid through a heat exchanger disposed in said higher velocity, laminar flow for pre-heating said cycle fluid; and directing the pre-heated cycle fluid through another heat exchanger immersed in said bed of granular material for primary heating of the cycle fluid.

9. A method as set forth in claim 8, wherein said higher velocity created during said developing step is in the range of approximately 1.7 to 3.5 times said superficial velocity.

10. A method as set forth in claim 9, wherein said higher velocity is approximately twice said superficial velocity.

* * * * *